May 29, 1934.   F. L. SNYDER   1,960,557
PIPE FITTING
Filed April 22, 1931
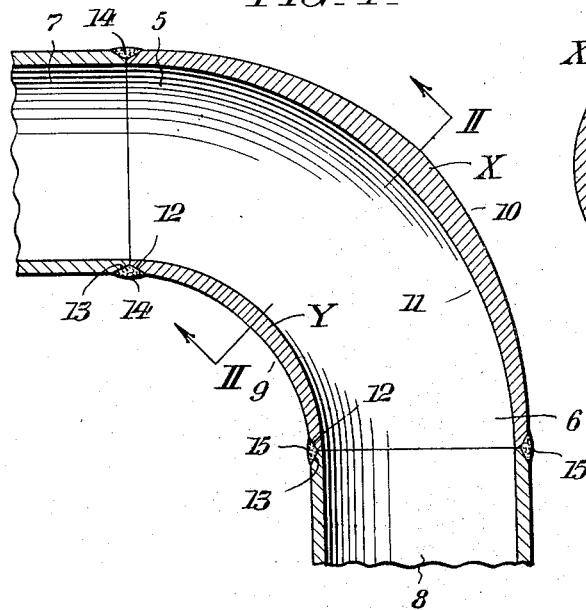
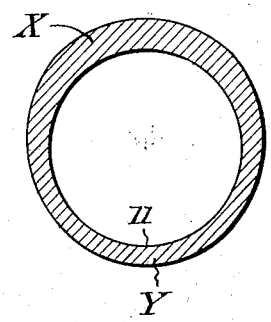
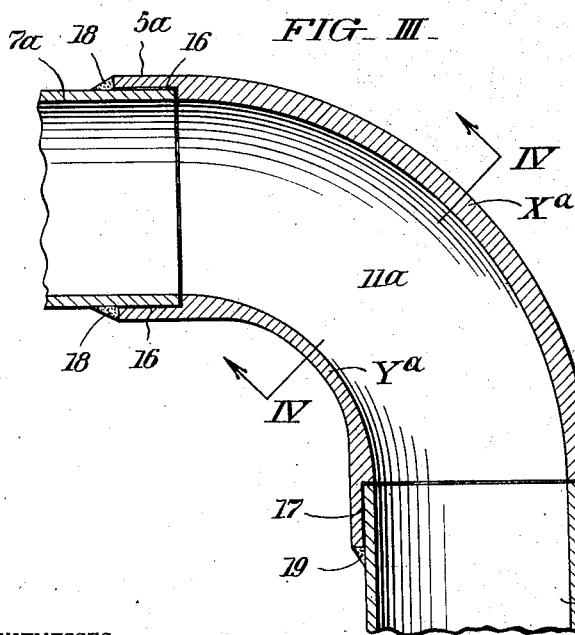
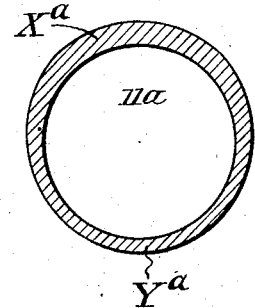
WITNESSES
INVENTOR:
Ferdinand L. Snyder,
BY
ATTORNEYS.

Patented May 29, 1934

1,960,557

UNITED STATES PATENT OFFICE 1,960,557

PIPE FITTING

Ferdinand L. Snyder, Wilmington, Del., assignor to Tube-Turns, Incorporated, Louisville, Ky., a corporation of Kentucky Application April 22, 1931, Serial No. 531,893

1 Claim. (Cl. 137—75)

This invention relates to pipe fittings; and it is more particularly concerned with elbow fittings designed for permanent incorporation with the pipe ends by welding.

By reason of determining abrupt angular changes in the fluid flow through piping, elbow fittings are called upon not only to withstand the static pressures of the fluids, but also the kinetically induced stresses attendant upon fluid flow, as well as external stress induced through thermal expansion. So called "weld" elbow fittings are ordinarily made by bending, to the desired angles, short lengths of drawn tubing having a uniform wall thickness and whereof the gauge is initially the same throughout as the piping with which the fittings are intended to be used. Due to working and attenuation of the metal incident to manufacture, fittings made in the manner just explained are inherently weak at the regions where they are subjected to greatest strains aforesaid, i. e. at the regions of maximum radii, or are of unnecessarily great thickness at the regions of minimum radii. Such fittings are thus unnecessarily heavy or incapable of withstanding strains within the force resistive capacity of the piping, and therefore liable to fracture with disastrous results.

In the main, my invention is directed toward overcoming the drawbacks just pointed out. In other words, I aim to adequately strengthen fittings of the kind referred to as well as to increase their resistivity to erosion when acid or alkali fluids or fluids at high velocity are being conducted through them, by reinforcing them in those regions which are most directly subject to the kinetically induced stresses of fluid flow as well as the external stresses induced by thermal expansion.

A further object of my invention is to secure the above advantages in a pipe fitting capable of ready and economic manufacture and without the aid of special machinery and without incidental straining, from metal having the same physical and chemical characteristics as the welding material used in connecting the fitting permanently with the piping; which lends itself to embodiment in suitable forms for either butt or overlap welding with the pipes; and which is susceptible of modification to suit special conditions of use.

Still other objects and attendant advantages of this invention will be manifest from the detailed description following in connection with the attached drawing wherein; Fig. I is an axial sectional view of a butt-weld pipe elbow conveniently embodying the present improvement.

Fig. II shows a cross sectional view of the fitting taken as indicated by the arrows II—II in Fig. I.

Fig. III is a view corresponding to Fig. I showing an alternative form of pipe elbow intended for lap welding, and Fig. IV is a cross sectional view taken as indicated by the arrows IV—IV in Fig. III.

Referring first to Fig. I of these illustrations, the elbow shown has its wall gradually increasing inwards of the ends 5, 6 from a thickness corresponding to that of the pipe sections 7, 8 with which it connects. The wall thickness of the fitting also increases circumferentially from the region 9 of shortest radius to the region 10 of longest radius; while the bore 11 is made uniform in caliber throughout so as not to impede the fluid flow, and disposed concentrically with respect to the outer circumference medially and diagonally of the fitting as shown in Fig. II. The fitting is thus effectively reinforced and strengthened in the regions which are subject to kinetically and thermally-induced stresses as well as to the static pressure of the fluid conducted through the piping of which the elbow forms a part, the thickness at X being preferably made substantially twice that at Y. For the purposes of butt joinder with the pipe sections 7, 8, the ends 5, 6 of the fitting and also the contiguous ends of the said pipe sections are bevelled as at 12 and 13 respectively with formation of an annular groove or gutter at the regions of abutment to receive the metal 14, 15 used in welding.

The elbow shown in Figs. III and IV is identical in construction with the first described embodiment except that its wall is made heavier at the ends 5a and 6a of the fitting and internal socket recesses 16 and 17 are there formed to telescopically receive the ends of the pipe sections 7a, 8a. In this case the junctures are made permanent through application of welding metal around the ends of the fitting as indicated at 18, 19.

The herein described forms of my improved fitting can be readily and cheaply manufactured in quantity by casting from metals such as iron, brass, bronze, etc., which lend themselves to the formation of welded joints; and by subjecting the castings to heat treatment so as to insure structural uniformity and homogeneity. Since welding metals can be chosen with properties identical to the metals used in casting the fittings in accordance with my invention, the resultant joints can be relied upon to withstand all pressures within the safety limits for which the piping is designed. My invention thus constitutes a very important advance in the art, and through it, all the uncertainties of previous practice are effectively eliminated.

Having thus described my invention, I claim:

As an article of manufacture and commerce, a welding elbow-pipe initially formed in one single piece of weldable metal; of substantially uniform circular bore, and bent or curved in an arc of substantially uniform radius along its neutral axis and also along both the outside and the inside of the bend; having smooth, evenly varying walls, without sudden projection or enlargement, which are of maximum thickness at the middle of the bend and thence taper and continue lengthwise to its ends; and also having its bore displaced eccentrically toward the inside of the bend, so that the walls taper circumferentially from the outside of the bend to the inside thereof, whereby the elbow affords maximum strength in proportion to the amount of metal in it and according to the stresses in all parts of it, including those due to the kinetic energy of the fluid at the outside of the bend, as well as to temperature changes.

FERDINAND L. SNYDER.